United States Patent Office 3,313,882
Patented Apr. 11, 1967

3,313,882

BLACK LEVEL CONTROL CIRCUIT FOR A TELEVISION RECEIVER UTILIZING A KEYED A.G.C.

Bernard D. Loughlin, Huntington, N.Y., assignor to Hazeltine Research, Inc., a corporation of Illinois Filed Oct. 3, 1963, Ser. No. 313,471
12 Claims. (Cl. 178—7.5)

Figure 1:
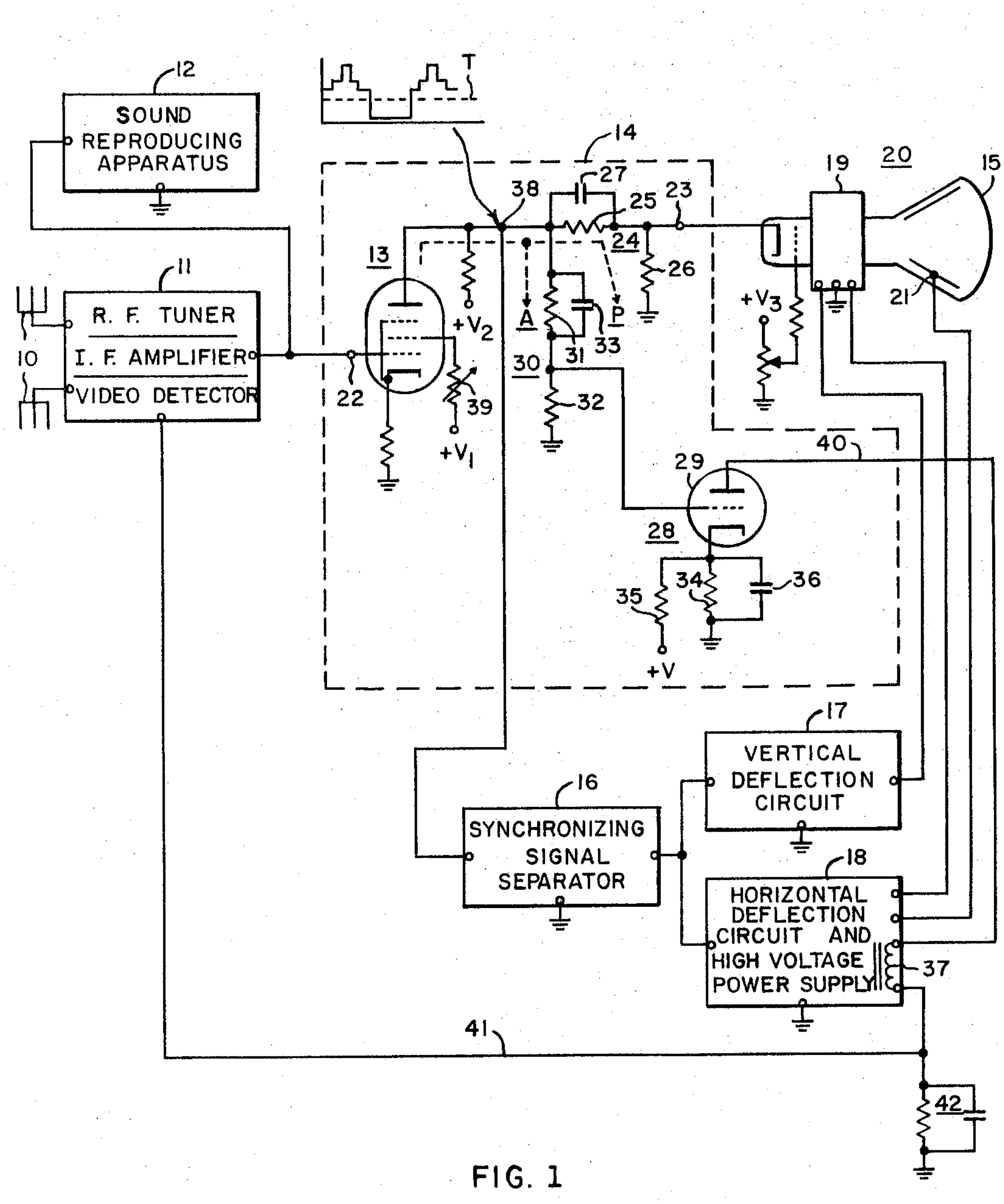

The present invention relates to a black level control circuit for a television receiver and, more particularly, to a control circuit useful in such a receiver for limiting the amount of beam current flowing in the cathode-ray tube thereof, while, at the same time, maintaining correct black level operation in the reproduced image.

One of the major problems encountered in black level stabilization system design, whether the stabilization be achieved by direct-current (D.-C.) restoration or by D.-C. coupling, is that the possibility exists that the high D.-C. beam currents required on scenes of high average brightness could overload the type of high voltage power supply circuit presently being used in television receivers. Such overloading would be observed by the viewer as substantial changes in the width to height ratio of the picture dimensions, improper horizontal scanning operation, and other such similarly objectionable effects.

Even if the receiver were designed with scanning circuit power capability sufficient to eliminate such overload effects, the variations in reproduced picture brightness due to changes in scene content, as from a low average brightness scene to a high average brightness scene, may prove objectionable to the viewer. This would be especially so if the room ambient light level were low.

Copending application Ser. No. 309,773 filed Sept. 18, 1963, and entitled, "Picture Control Apparatus for a Television Receiver," teaches that it is possible to minimize such overload effects and such annoying subjective effects by reducing the video signal gain as scene brightness increases. Since the idea presented in that application is described with reference to a back porch keyed automatic-gain-control (AGC) circuit in which the blanking level of the video signal is stabilized at the cathode-ray tube, the turning down of the video gain does not result in any sacrifice in black level performance. However, such is not the case with a sync peak keyed AGC circuit. With such an arrangement the synchronizing pulse peaks of the video signal and not the blanking level are stabilized at the cathode-ray tube. The effect of reducing the video signal gain, while reducing any annoying subjective effects that might occur due to changes in scene brightness and minimizing the possibility of power supply overload on scenes of high average brightness, results in undesired blanking level drift, and, since the blanking level differs from the black level by a small fixed amount ("set-up"), also results in undesired drift in background brightness. Copending application Ser. No. 309,774, filed Sept. 18, 1963, and entitled, "Black Level Control Circuit for a Television Receiver," teaches that it is possible to compensate these undesired black level variations by reducing the level at which the synchronizing pulse peaks are stabilized at the cathode-ray tube as the video signal gain is reduced. Whereas, this type of compensation is described with reference to a black level control circuit which provides a current operative video turn down effect, a voltage operative video turn down effect could be used as well. In this regard, current operative video turn down exists when the sync peak keyed AGC circuit responds to cathode-ray tube beam current to reduce the video signal gain as beam current increases, while voltage operative turn down exists when the sync peak keyed AGC circuit responds to a predetermined video signal voltage level to reduce the video signal gain as that level increases, each due to increases in the average brightness value of the transmitted scene. It is to be understood, however, that the terms "current operative video turn down" and "voltage operative video turn down" are not limited to sync peak keyed AGC circuits but apply to back porch keyed AGC circuits as well.

It is an object of the present invention, therefore to provide a black level control circuit for a television receiver utilizing a sync peak keyed AGC circuit which operates to provide a voltage operative video turn down effect as scene brightness increases to limit the amount of beam current flowing in the picture tube so as to reduce the possibility of any annoying subjective effects or overload effects being produced and which correctly reproduces black level in the reproduced image over the entire range of scene contents, even in the presence of such video reduction.

It is another object of the present invention to provide a black level control circuit having the same over-all performance characteristics just described but one which utilizes a back porch keyed AGC circuit instead of a sync peak keyed AGC circuit.

It is a further object of the present invention to provide such black level control circuits at a minimum of cost and circuit complexity.

In accordance with the present invention, there is provided a black level control circuit for a television receiver which utilizes a cathode-ray tube for purposes of image reproduction including means for supplying a video signal having a D.-C. component representative of average scene brightness which may vary from scene to scene, and having a synchronizing pulse level, a blanking level, and a black level intended to correspond to black in the reproduced image, the supply means including control means for varying the magnitude of the supplied video signal; means, including a video signal amplifier, for translating the supplied video signal to the cathode-ray tube at a first A.-C./D.-C. transmission ratio and to the input of a keyed automatic-gain-control circuit at a second A.-C./D.-C. transmission ratio, wherein the first and second ratios bear a predetermined relationship to one another and are each greater than unity; a keyed automatic-gain-control circuit responsive to a selected level of the video signal translated thereto at the second A.-C./D.-C. transmission ratio for developing an output signal jointly representative of variations in received signal intensity and of variations in average scene brightness; and means for coupling the output signal to the control means for varying the magnitude of the supplied video signal to stabilize the selected level at the input of the automatic-gain-control circuit, thereby stabilizing black level at the cathode-ray tube and limiting the amount of beam current flowing in the cathode-ray tube on scenes of high average brightness.

For a better understanding of the present invention together with other and further objects thereof, reference is had to the following description taken in connection with the accompanying drawings, and its scope will be pointed out in the appended claims.

Figure 2:
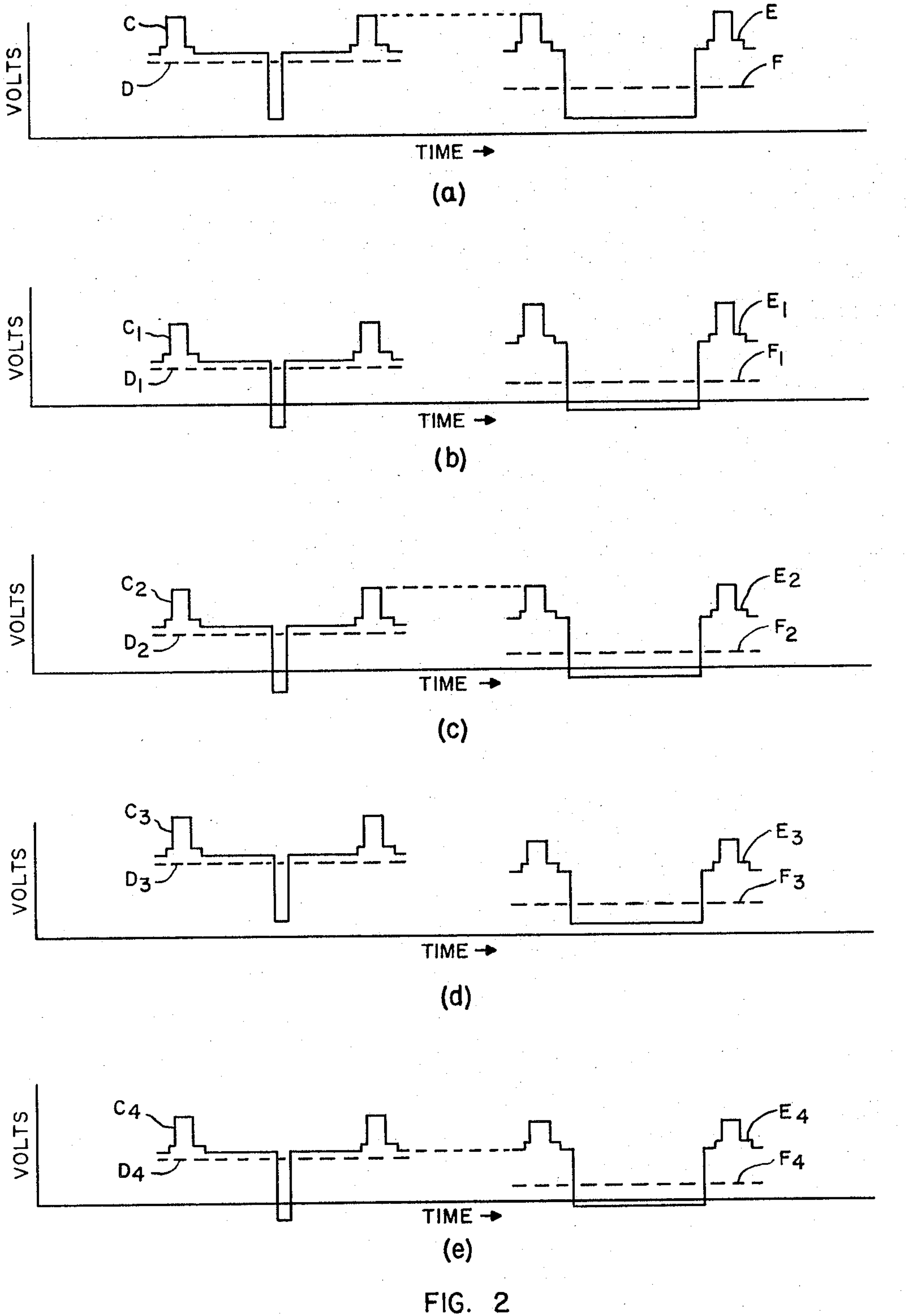
Figure 3:
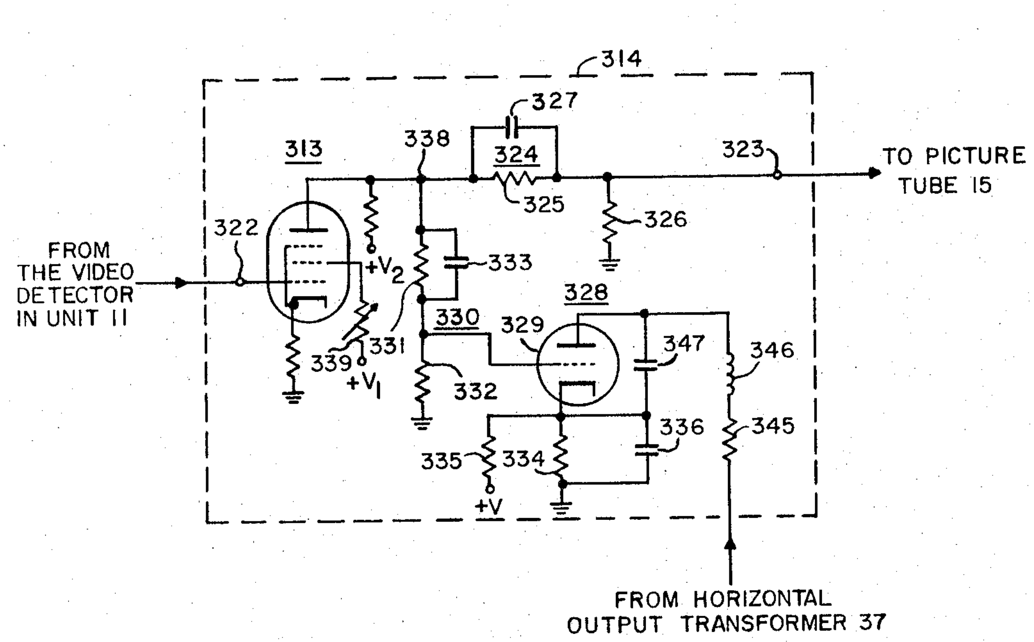
Figure 4:
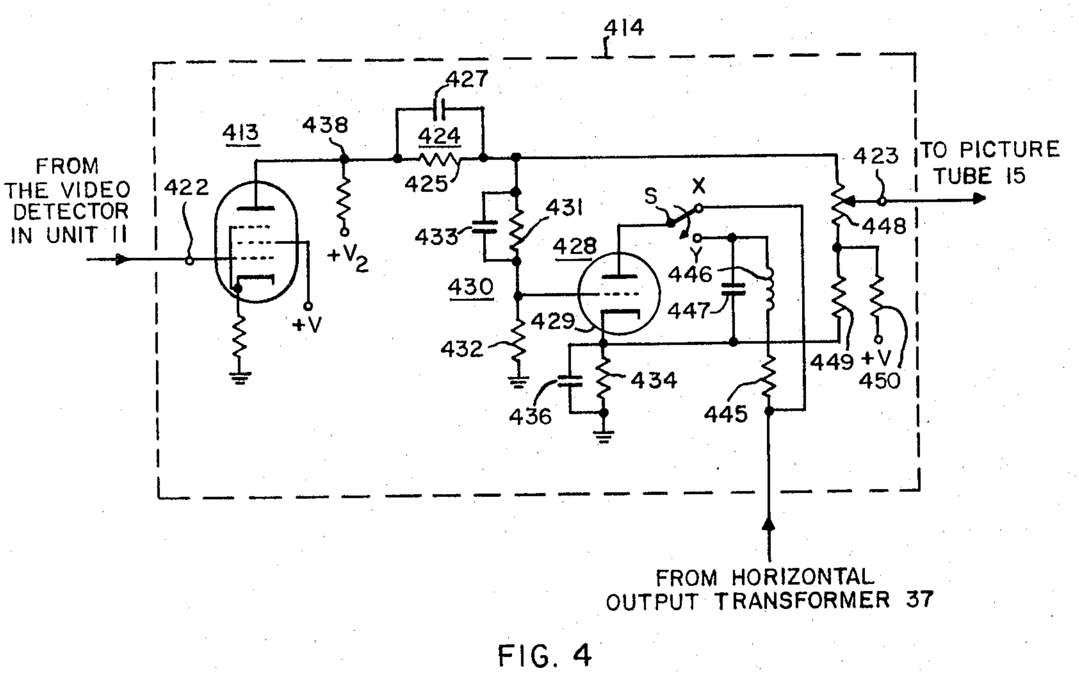

Referring to the drawings:

FIG. 1 is a circuit diagram, partly schematic, of a television receiver embodying a black level control circuit constructed in accordance with a particular form of the present invention;

FIG. 2, *a–e* inclusive, are signal waveforms useful in explaining the operation of one form of the present invention;

FIG. 3 is an alternative form of a black level control circuit useful in the television receiver of FIG. 1 and constructed in accordance with the present invention; and FIG. 4 is another form of a black level control circuit useful in the television receiver of FIG. 1 and constructed in accordance with the present invention.

*General*

Referring to FIG. 1, there is shown a television receiver embodying a black level control circuit constructed in accordance with one form of the present invention. Thus, with the exception of the control circuit, and unless otherwise noted, the receiver may be of conventional construction. The receiver comprises, in part, antenna system 10, coupled to the input of unit 11 which includes the usual radio-frequency (RF) tuner, intermediate-frequency (IF) amplifier, and video detector from which are derived a sound modulated intercarrier beat note component and a video signal component. The sound component is applied to sound reproducing apparatus 12 wherein it is amplified, detected, and reproduced by the sound reproducing device. The video signal component is D.-C. coupled from the video detector in unit 11 to the control grid of video amplifier 13 within control circuit 14 wherein it is amplified, reversed in polarity, and applied through the remainder of control circuit 14 to a cathode-ray type image-reproducing device or picture tube 15 in a manner to be subsequently described. The video signal developed by amplifier 13 is also applied to synchronizing signal separator 16 wherein the synchronizing pulses in the composite signal are stripped and applied to the vertical and horizontal circuits 17 and 18. Beam deflection signals are developed in these circuits in the usual manner and applied to the deflection yoke 19 of image-reproducing apparatus 20. Unit 18 additionally includes a high voltage power supply which provides the operating potential required by the high voltage anode 21 of picture tube 15. As will become clear hereinafter, control circuit 14, as embodied in FIG. 1, provides correct black level operation in the reproduced image over the entire range of scene contents while limiting the amount of beam current flowing in picture tube 15 on scenes of high average brightness by reducing the video signal gain as the average brightness of the transmitted scene increases.

*Description and operation of black level control circuit 14 of FIG. 1*

Referring now more particularly to the black level control circuit 14 which embodies one form of the present invention, the arrangement there represented includes means, such as input terminal 22, for supplying a video signal having an average value which may vary from scene to scene.

The signal so supplied is, in effect, a composite signal consisting of an image-representative portion and a synchronizing portion. The image or picture portion is composed of A.-C. and D.-C. components representing respectively the instantaneous brightness and average brightness value of the transmitted image at successive points along successive closely spaced scanning lines. The synchronizing portion, on the other hand, comprises a series of recurrent or synchronizing pulses which mark the instant at which each of the successive scanning lines is generated. These synchronizing pulses may extend either in a positive or negative direction from a predetermined level, hereinafter referred to as the blanking level depending upon the polarity of the video detector in unit 11. In the description that follows, it is to be understood that the polarity of the video detector is such that, at input terminal 22, the synchronizing pulses extend in a negative direction from the blanking level.

In addition to the transmission of the synchronizing pulses and blanking level during the synchronizing portion of the video signal, there is also transmitted a second reference level intended to correspond to black in the reproduced image and subsequently referred to as the black level. These three levels of intensity—the level to which the synchronizing pulses extend, the blanking level, and the black level—are mutually related through the medium of the video signal waveform as transmitted in accordance with Federal Communications Commission regulations.

Control circuit 14 also includes means, connected between input terminal 22 and output terminal 23, for coupling the supplied video signal to the picture tube 15. Such means includes the network P including the aforementioned video amplifier 13 and voltage divider network 24, which consists of resistors 25 and 26 and capacitor 27, network P having a predetermined A.-C./D.-C. transmission ratio from the video detector to the picture tube 15 as set forth below.

Control circuit 14 additionally includes means, such as AGC circuit 28, for varying the magnitude of the supplied video signal in response to variations in its average value and moreover, for varying the magnitude of the supplied video signal in a direction opposite to variations in its average brightness value, to limit the amount of beam current flowing in picture tube 15. AGC circuit 28 specifically includes a triode type vacuum tube 29, the control grid of which is connected to input terminal 22 through the network which comprises a second voltage divider network 30, including resistors 31 and 32 and capacitor 33, and video amplifier 13. AGC circuit 28 also includes a cathode biasing network including resistors 34 and 35, bypass capacitor 36 and voltage supply +V. As will be made clear below, the amount by which the video signal magnitude is varied as the transmitted scene changes in brightness value is determined by the A.-C./D.-C. transmission ratio of network A.

AGC circuit 28 is also included in control circuit 14 to stabilize the video signal black level at picture tube 15, but is responsive to a level other than the black level. To be more specific, the AGC circuit 28 depicted in FIG. 1 responds to the video signal synchronizing pulses and stabilizes the level to which those pulses extend at the control grid of triode 29. This is accomplished by keying triode 29 into plate current conduction during the synchronizing pulse interval of the video signal by pulses derived from the flyback transformer 37 in unit 18. In this regard, it is to be noted that these pulses have an overlapping time relationship with the synchronizing pulses. However, as will be more fully described during the description of the operation of control circuit 14, stabilization of the synchronizing pulse peaks rather than the black level produces undesired variations of the black level at picture tube 15 as the video signal magnitude is varied. Furthermore, it will also be shown below that proper selection of the A.-C./D.-C. transmission ratio of network P relative to the A.-C./D.-C. transmission ratio of network A compensates for these undesired variations so that correct black level operation is maintained in the reproduced image.

Although control circuit 14, as embodied in FIG. 1, operates to reduce any annoying subjective effects that may be produced upon the viewer due to changes in scene brightness and to prevent power supply overload on scenes of high average brightness value, the discussion relating to its operation will be limited to the feature of overload protection. This is not to be construed as a belittling of the subjective impression feature of the invention but as a means of simplifying the discussion that follows. It is to be understood that in limiting the amount of beam current flowing in the picture tube 15, the reproduced image is prevented from becoming excessively bright. In this manner changes in scene brightness, as from a low brightness scene to a high brightness scene, do not prove objectionable to the viewer. This concept is to be carried throughout the forthcoming discussion relating to control circuit 14, as well as to the other forms of the invention described, though no mention of it is made. Furthermore, it is to be understood that the subjective impression feature applies even if the high voltage power supply located in unit 18 is not susceptible to overload.

In operation, the supplied video signal at input terminal 22 is amplified and reversed in polarity by video amplifier 13 so that the signal developed at its output terminal 38 has its synchronizing pulses extending in a positive direction from the blanking level. Such a signal is shown by the waveform above terminal 38 where T represents the D.-C. component or average value of the signal. FIG. 2*a* of the drawings more clearly represents a small portion of the signal developed at terminal 38 with the invention inoperative. Specifically, in FIG. 2*a*, waveform C, having a D.-C. component D, represents a low average brightness scene, whereas, waveform E, having a D.-C. component F represents a high average brightness scene. For the sake of clarity, medium average brightness scenes have been purposely omitted.

In the discussion that follows, it is to be understood that video amplifier 13 has been considered as ideal, i.e., that there is no D.-C. loss, such as by screen grid or cathode degeneration, associated with it. Although this is not the general case, such an assumption will facilitate the description of the operation of the invention. The general case will be treated later in the discussion. Thus, referring once again to FIG. 1, the A.-C./D.-C. transmission ratio associated with network A, is due solely to the voltage divider network 30, while the A.-C./D.-C. transmission ratio associated with network P is due solely to the voltage divider network 24.

As was previously mentioned, the amount by which the video gain is varied as the transmitted scene changes in brightness value is determined by the A.C./D.-C. transmission ratio associated with network A, or in accordance with the above assumption, by the A.-C./D.-C. transmission ratio associated with divider network 30. This can be more clearly understood from a consideration of the waveform of FIG. 2*b*.

The video signal developed at the output of video amplifier 13 is coupled through divider network 30 to the control grid of AGC triode 29. One path of network 30, including capacitor 33, translates the A.-C. component of the signal while a second path, including resistors 31 and 32, translates a portion of the D.-C. component. Neglecting for a moment the operation of AGC circuit 28, the video signal as it appears at the control grid of tube 29 is shown in FIG. 2*b*. It will be noted therefrom that the A.-C. components of waveforms $C_1$ and $E_1$, the translated counterparts of waveforms C and E, remain unchanged after translation. However, D.-C. components D and F are each proportionately reduced to $D_1$ and $F_1$ by an amount determined by the resistance divider ratio $$\frac{R_{31}}{R_{31}+R_{32}}$$

But AGC circuit 28 operates to derive a control effect during the time at which the synchronizing pulses are present at the control grid of triode 29. The AGC signal so derived is coupled through wire 40, transformer 37, wire 41 and network 42 to the amplifiers within unit 11 to reduce the video signal magnitude until the level of the synchronizing pulse peaks returns to its original level, as shown in FIG. 2*c*. This action is hereafter referred to as "video turn down."

Referring once again to the waveforms shown in FIGS. 2*a* and 2*b*, it can be seen that the amount of video turn down necessary to stabilize the synchronizing pulse peaks at the AGC keyer 29, is determined by the A.-C./D.-C. transmission ratio of divider network 30, or more particularly by the excess A.-C. transmission over D.-C. transmission of network 30. To illustrate, if the signal developed at video amplifier 13 were coupled to the AGC circuit 28 with no attenuation of the A.-C. and D.-C. components, or with equal attenuation of both, the synchronizing pulse peaks of either waveforms C or E would line up at the same level of potential at triode 29 so that no video turn down would be necessary to stabilize them at the same level. However, as less and less of the D.-C. component is coupled to the AGC circuit 28, the amount of video turn down necessary to stabilize the synchronizing pulse peaks at triode 29 correspondingly increases, the amount of turn down necessary reaching a maximum when the D.-C. component of the video signal is completely suppressed, i.e., when the video signal is A.-C. coupled to keyer 29. This results due to the substantial difference between the small A.-C. component of the low average brightness signal and the large A.-C. component of the high average brightness signal.

In the description that follows it will be understood that the ratio of A.-C. transmission to D.-C. transmission from the video amplifier terminal 38 to the AGC circuit 28 will be referred to as $M_A$. Thus, the amount of video turn down for a given change in scene brightness is dependent on the value chosen for $M_A$; the higher the value of $M_A$ (approaching the A.-C. coupled condition), the greater the video turn down while the lower the value of $M_A$ (approaching the condition of equal A.-C. and D.-C. component attenuation), the smaller the video turn down.

However, $M_A$ should not be chosen too large or too small but at some intermediate value, since a small amount of video turn down on high brightness scenes may have little effect in reducing the subjectively irritating picture glare that often results on such scenes, and a large amount of video turn down on high brightness scenes may limit the distinguishability of the reproduced image.

With the arrangement as shown in FIG. 1, the amount by which the magnitude of the supplied video signal is reduced as the supplied video signal changes from one representing a nearly all black scene to one representing an all white scene is given by the expression:

$$\frac{E_{\lim \alpha \to 0}}{E_{\alpha=1}}=1+\beta \qquad (1)$$

where $E$=the magnitude of the supplied video signal measured between the black level and the white level, $\alpha$=a variable representative of the average brightness value of the transmitted scene such that $\alpha=0$ corresponds to an all black scene and $\alpha=1$ corresponds to an all white scene, and $\beta$=a constant determined by the A.-C./D.-C. transmission ratio $M_A$ as given by the expression $$\beta=\frac{0.77(M_A-1)}{1.236+0.364M_A} \qquad (2)$$

The amount of video signal reduction as the transmitted signal changes from one representing a nearly all black scene to one representing a scene of medium average brightness is more generally given by the expression $$\frac{E_{\lim \alpha \to 0}}{E_{\alpha=\alpha}}=1+\beta\alpha \qquad (4)$$

where $\beta$ is the same as defined in expression (2) above. It is to be understood that in deriving the expressions (1) and (2), as well as the expressions (3), (31), (32) and (33) below, various assumptions were made. They were as follows:

(a) The video signal blanking level=75% of the peak carrier signal;

(b) The video signal black level =70% of the peak carrier signal;

(c) The video signal synchronizing pulse peaks extend to a level which=100% of the peak carrier signal;

(d) The video signal white level=12.5% of the peak carrier signal level;

(e) The duty cycle of the synchronizing pulse portion of the video signal=9%;

(f) The duty cycle of the picture representative portion of the video signal=77%.

However, this video turn down to prevent overload, by adjusting the video gain until the synchronizing pulses are stabilized at the AGC keyer 29, produces variations in the black level of the signal developed at the video amplifier output terminal 38. This is shown in FIG. 2*d*. For a given value of A.-C./D.-C. gain ratio, $M_A$, these variations are related to the average value of the signal developed at the output of amplifier 13, i.e., a change in scene brightness from a nearly all black scene to an all white scene produces a greater shift in black level at terminal 38 than a change in scene brightness from a nearly all black scene to one of medium average brightness. Therefore, if the video signal developed at terminal 38 were coupled to picture tube 15 with no attenuation of the A.-C. and D.-C. components or with equal attenuation of both, the ensuing variations at the picture tube would result in black level operation in the reproduced image which would be somewhat less than desirable. But, as represented in FIG. 1, the video signal is coupled to the picture tube 15 through the voltage divider network 24, wherein one path of which, including capacitor 27, translates the A.-C. components of the signal and wherein another path of which, including resistors 25 and 26, translates a portion of the D.-C. component. It is therefore seen that divider network 24 has an A.-C./D.-C. transmission ratio other than unity. This ratio will hereinafter be referred to as $M_P$. To compensate for the undesired black level variations at the picture tube 15 all that is necessary is to relate the A.-C./D.-C. transmission ratio $M_P$ to the A.-C./D.-C. transmission ratio $M_A$ by the expression $$M_P=\frac{M_A}{0.70+0.30M_A} \qquad (3)$$

With relationships (1), (2) and (3) established, the possibility of high voltage power supply overload is minimized while black level is maintained constant in the reproduced image. FIG. 2*e* represents the video signal waveform at the cathode of picture tube 15.

While applicant does not wish to be limited to any particular set of values it has been found that if $M_A$ is chosen to equal 5.00 the percentage of video turn down at the output of video amplifier 13 as the transmitted scene changes from nearly all black to all white is approximately 50%, and for correct black level operation to result in the reproduced image, $M_P$, the A.-C./D.-C. transmission ratio of network 24, should equal approximately 2.27.

*Black level control circuit of FIG. 3*

There is shown in FIG. 3 a modified form of black level control circuit 314 similar to black level control circuit 14 of FIG. 1, in which corresponding components carry the same reference numerals as in FIG. 1, except preceded by the numeral "3." Control circuit 314 differs from the previously described circuit in that AGC circuit 328 operates to stabilize the blanking level of the video signal at the control grid of triode 329 instead of the synchronizing pulse peaks. This is accomplished by coupling the flyback pulses from horizontal output transformer 37 to the plate of keyer 329 through a delay circuit including resistor 345, inductor 346 and capacitor 347. The delay is such that plate current conduction does not occur until after the synchronizing pulse portion of the video signal has passed and the blanking interval has begun. Thus, AGC circuit 328 operates as a back porch keyed AGC circuit instead of as a sync peak keyed AGC circuit as in FIG. 1. Such a back porch keyed AGC circuit is more fully described in application Ser. No. 223,493, filed Sept. 13, 1962 and entitled, "Control Apparatus for a Television Receiver," which has been abandoned. Except for this difference control circuits 314 and 14 are exactly alike in construction and operation.

The effect the use of a back porch keyed AGC circuit instead of a sync peak keyed AGC circuit has on the operation of the control circuit of FIG. 1 can be seen from a comparison of the equation relating to the amount of video turn down to prevent overload as scene brightness increases and to the A.-C./D.C. transmission interrelations to maintain correct black level operation at the picture tube 15 as set forth in Table 1 below.

TABLE 1

| | Sync Peak AGC | Back Porch AGC |
|---|---|---|
| A. Variation of video gain as a function of scene brightness | $\frac{E_{\lim \alpha\to 0}}{E_{\alpha=1}}=1+\beta$ (1) | $\frac{E_{\lim \alpha\to 0}}{E_{\alpha=1}}=1+\beta$ (31) |
| B. Value of $\beta$ | $\beta=\frac{0.77(M_A-1)}{1.236+0.364M_A}$ (2) | $\beta=\frac{0.77(M_A-1)}{1.236-0.036M_A}$ (32) |
| C. Relationship between $M_P$ and $M_A$ to maintain black level constant in the reproduced image | $M_P=\frac{M_A}{0.70+0.30M_A}$ (3) | $M_P=\frac{M_A}{0.933+0.067M_A}$ (33) |

Here too, it should be noted that while expression (31) shows the percentage of video gain reduction as the transmitted signal changes from one representing a nearly all black scene to one representing an all white scene the more general expression is as given by (4) above.

While applicant does not wish to be limited to any particular set of values it has been found that if the percentage of video turn down at the output of video amplifier 313 as the transmitted scene changes from nearly all black to all white is chosen to equal 50%, then for a back porch keyed AGC circuit, $M_A$ for the A.-C./D.-C. transmission ratio of network 330, is approximately 2.50. Thus, for the same amount of video turn down—50%—the A.-C./D.-C. transmission ratio from the video amplifier 313 to the AGC circuit 328 for a back porch keyed AGC arrangement is less than that for a sync peak keyed AGC arrangement, 2.50 as compared to 5.00. In other words, a greater loss in D.-C. coupling is required with a sync peak keyed AGC circuit than with a back porch keyed AGC circuit to achieve a given gain reduction. In addition, $M_P$, the A.-C./D.-C. transmission ratio associated with network 324, i.e., from the video amplifier 313 to the picture tube 15 should equal approximately 2.26 in order to compensate for the black level variations that would otherwise result at the picture tube 15 as scene brightness increases.

*Black level control circuit of FIG. 4*

There is shown in FIG. 4 another modified form of black level control circuit 414 similar to black level control circuit 14 of FIG. 1 and 314 of FIG. 3, in which corresponding components carry the same reference numerals as in those figures, except preceded by the numeral "4" Control circuit 414 differs from the previously described circuits in that the A.-C./D.-C. transmission ratio network 424 from the video amplifier 413 to the picture tube 15 is contained within the A.-C./D.C. transmission network from the video amplifier 413 to the AGC circuit 428. This is accomplished by connecting network 430 to the picture tube side of network 424 rather than to the video amplifier side. In this regard, resistors 431 and 432 serve as the D.-C. voltage divider resistors of network 430 and, in conjunction with resistor 425, as part of the D.-C. coupling path of network 424. However, the fact that network 424 is contained within the over-all transmission network to the AGC circuit 428 does not affect the equations for overload protection and black level operation as presented in Table 1 above. That is, if switch S is in position X, AGC circuit 428 operates as a sync peak keyed AGC circuit and Equations 1, 2 and 3 apply. Conversely, if switch S is in position Y, AGC circuit 428 operates as a back porch keyed AGC circuit and Equations 31, 32 and 33 apply.

Control circuit 414 also differs from the previously described circuits in that the contrast control is located after the point stabilized by the AGC circuit 428, instead of before the point stabilized by the AGC circuit 428. Contrast control 448 has one input terminal connected to the junction point of transmission networks 424 and 430, another input terminal connected to the junction point of cathode bias resistors 449 and 450, and an adjustable output terminal connected to the cathode of picture tube 15. In accordance with the teachings of the present invention, the video signal black level is stabilized at the junction of networks 424 and 430 regardless of whether switch S is in position X or Y, i.e., regardless of whether AGC circuit 428 is the sync peak keyed or back porch keyed variety. Then if resistors 434, 449 and 450 are chosen so that the potential established at the junction of resistors 449 and 450 is the same as that at which black is stabilized at the junction of networks 424 and 430, adjustment of the contrast control 448 will have no effect on black in the reproduced image. Such a contrast control is similar to one more fully described in copending application Ser. No. 292,246, filed July 2, 1963, and entitled, "Apparatus for Controlling the Video Signal of a Television Receiver."

In the preceding discussion it was assumed that video amplifier 13 (313, 413) was ideal. As such, the A.-C./D.-C. transmission ratio from the video detector in unit 11 to the picture tube 15 was considered to be due entirely to network 24 (324, 424) while the A.-C./D.-C. transmission ratio from the video detector to the AGC circuit 28 (328, 428) was considered to be due entirely to network 30 (330, 424 and 430). However, where video amplifier 13 (313, 413) is not ideal but has some D.-C. loss then, in FIG. 1, for example, the A.-C./D.-C. transmission ratio from the video detector to the picture tube 15 is really composed of two parts: an A.-C./D.-C. transmission ratio due to the video amplifier 13 and an A.-C./D.-C. transmission ratio due to the voltage divider network 24. Similarly, the A.-C./D.-C. transmission ratio from the video detector to the AGC circuit 28 is composed of an A.-C./D.-C. transmission ratio due to the video amplifier 13 and an A.-C./D.-C. transmission ratio due to the voltage divider network 30. In such a case, the multiplication products of the component A.-C. and D.-C. transmission ratios to the AGC circuit and to the picture tube must satisfy the black level Equation 3 or 33 in Table 1. In addition it is possible to eliminate network 24 altogether by using a video amplifier having suitable D.-C. loss, such as by screen grid or cathode D.-C. degeneration.

It is necessary to keep in mind, however, that the A.-C./D.-C. transmission interrelations as expressed in Equation 3 or 33 must be satisfied for correct black level operation to result at the picture tube 15.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A black level control circuit for a television receiver which utilizes a cathode-ray tube for purposes of image reproduction comprising:

means for supplying a video signal having a D.-C. component representative of average scene brightness which may vary from scene to scene, and having a synchronizing pulse level, a blanking level, and a black level intended to correspond to black in the reproduced image, said supply means including control means for varying the magnitude of said supplied video signal;

means, including a video signal amplifier, for translating said supplied video signal to said cathode-ray tube at a first A.-C./D.-C. transmission ratio and to the input of a keyed automatic-gain-control circuit at a second A.-C./D.-C. transmission ratio, wherein said first and second ratios bear a predetermined relationship to one another and are each greater than unity;

a keyed automatic-gain-control circuit responsive to a selected level of the video signal translated thereto at said second A.-C./D.-C. transmission ratio for developing an output signal jointly representative of variations in received signal intensity and of variations in average scene brightness;

and means for coupling said output signal to said control means for varying the magnitude of said supplied video signal to stabilize said selected level at the input of said automatic-gain-control circuit, thereby stabilizing black level at said cathode-ray tube and limiting the amount of beam current flowing in said cathode-ray tube on scenes of high average brightness.

2. A black level control circuit in accordance with claim 1 in which said translating means includes a first voltage divider network coupled to the output of said video signal amplifier for providing in conjunction therewith, said first A.-C./D.-C. transmission ratio, and a second voltage divider network coupled to the output of said video signal amplifier for providing in conjunction therewith, said second A.-C./D.-C. transmission ratio.

3. A black level control circuit in accordance with claim 1 in which said translating means includes a single voltage divider network coupled to the output of said video signal amplifier, and having two separate outputs, for providing said first A.-C./D.-C. transmission ratio at a first output coupled to said cathode-ray tube and said second A.-C./D.-C. transmission ratio at a second output coupled to said automatic-gain-control circuit.

4. A black level control circuit in accordance with claim 1 in which the magnitude of the supplied video signal is varied as an inverse function both of variations in received signal intensity and of variations in average scene brightness.

5. A black level control circuit in accordance with claim 1 in which said keyed automatic-gain-control circuit is responsive to the synchronizing pulse level of the video signal translated thereto at said second A.-C./D.-C. transmission ratio for developing an output signal proportional to said level and the changes therein jointly caused by variations in received signal intensity and variations in average scene brightness.

6. A black level control circuit in accordance with claim 1 in which said keyed automatic-gain-control circuit is responsive to the blanking level of the video signal translated thereto at said second A.-C./D.-C. transmission ration for developing an output signal proportional to said level and the changes therein jointly caused by variations in received signal intensity and by variations in average scene brightness.

7. A black level control circuit for a television receiver which utilizes a cathode-ray tube for purposes of image reproduction, comprising:

means for supplying a video signal having a D.-C. component representative of average scene brightness which may vary from scene to scene, and having a synchronizing pulse level, a blanking level, and a black level intended to correspond to black in the reproduced image, said supply means including control means for varying the magnitude of said supplied video signal;

means, including a video signal amplifier having first and second voltage divider networks coupled to its outputs, for translating said supplied video signal to said cathode-ray tube at a first A.-C./D.-C. transmission ratio and to the input of a keyed automatic-gain-control circuit at a second A.-C./D.-C. transmission ratio, wherein said first and second ratios bear a predetermined relationship to one another and are each greater than unity;

a keyed automatic-gain-control circuit responsive to the synchronizing pulse level of the video signal translated thereto at said second A.-C./D.-C. transmission ratio for developing an output signal proportional to said level and the changes therein jointly caused by variations in received signal intensity and variations in average scene brightness;

and means for coupling said output signal to said control means for varying the magnitude of said supplied video signal as an inverse function both of variations in received signal intensity and of variations in average scene brightness to stabilize said synchronizing pulse level at the input of said automatic-gain-control circuit, thereby stabilizing black level at said cathode-ray tube and limiting the amount of beam current flowing in said cathode-ray tube on scenes of high average brightness.

8. A black level control circuit in accordance with claim 7 in which said first A.-C./D.-C. transmission ratio is related to said second A.-C./D.-C. transmission ratio by the expression:

$$M_P=\frac{M_A}{0.70+0.30M_A}$$

where $M_P$=said first A.-C./D.-C. transmission ratio, and where $M_A$=said second A.-C./D.-C. transmission ratio.

9. A black level control circuit in accordance with claim 7 in which the amount by which the magnitude of the supplied video signal is reduced as the supplied video signal changes from one representing a scene of low average brightness to one representing a scene of high average brightness is given by the expression:

$$\frac{E_{\lim}\alpha\rightarrow 0}{E_\alpha=\alpha}=1+\beta_\alpha$$

where $\alpha$=a variable representative of the average brightness value of the transmitted scene such that $\alpha=0$ corresponds to an all black scene and $\alpha=1$ corresponds to an all white scene, where $E$=the magnitude of the supplied video signal measured between the black level and the white level, and where $\beta$=a constant determined by the second A.-C./D.-C. transmission ratio as represented by the expression:

$$\beta=\frac{0.77(M_A-1)}{1.236+0.364M_A}$$

where $M_A$=said second A.-C./D.-C. transmission ratio.

10. A black level control circuit for a television receiver which utilizes a cathode-ray tube for purposes of image reproduction, comprising:

means for supplying a video signal having a D.-C. component representative of average scene brightness which may vary from scene to scene and having a synchronizing pulse level, a blanking level, and a black level intended to correspond to black in the reproduced image, said supply means including control means for varying the magnitude of said supplied video signal;

means, including a video signal amplifier having first and second voltage divider networks coupled to its outputs, for translating said supplied video signal to said cathode-ray tube at a first A.-C./D.-C. transmission ratio and to the input of a keyed automatic-gain-control circuit at a second A.-C./D.-C. transmission ratio, wherein said first and second ratios bear a predetermined relationship to one another and are each greater than unity;

a keyed automatic-gain-control circuit responsive to the blanking level of the video signal translated thereto to said second A.-C./D.-C. transmission ratio for developing an output signal proportional to said level and to the changes therein jointly caused by variations in received signal intensity and by variations in average scene brightness;

and means for coupling said output signal to said control means for varying the magnitude of said supplied video signal as an inverse function both of variations in received signal intensity and of variations in average scene brightness to stabilize said blinking level at the input of said automatic-gain-control circuit, thereby stabilizing black level at said cathode-ray tube and limiting the amount of beam current flowing in said cathode-ray tube on scenes of high average brightness.

11. A black level control circuit in accordance with claim 10 in which said first A.-C./D.-C. transmission ratio is related to said second A.-C./D.-C. transmission ratio by the expression:

$$M_P=\frac{M_A}{0.933+0.067M_A}$$

where $M_P$=said first A.-C./D.-C. transmission ratio, and where $M_A$=said second A.-C./D.-C. transmission ratio.

12. A black level control circuit in accordance with claim 10 in which the amount by which the magnitude of the supplied video signal is reduced as the supplied video signal changes from one representing a scene of low average brightness to one representnig a scene of high average brightness is given by the expression:

$$\frac{E_{\lim}\alpha\rightarrow 0}{E_\alpha=\alpha}=1+\beta_\alpha$$

where $\alpha$=a variable representative of the average brightness value of the transmitted scene such that $\alpha=0$ corresponds to an all black scene and $\alpha=1$ corresponds to an all white scene, where $E$=the magnitude of the supplied video signal measured between the black level and the white level, and where $\beta$=a constant determined by the second A.-C./D.-C. transmission ratio as represented by the expression:

$$\beta=\frac{0.77(M_A-1)}{1.236-0.036M_A}$$

where $M_A$=said second A.-C./D.-C. transmission ratio.

References Cited by the Examiner

UNITED STATES PATENTS 2,938,951 5/1960 Kraft ............ 178—7.5

DAVID G. REDINBAUGH, *Primary Examiner.*

J. McHUGH, R. L. RICHARDSON, *Assistant Examiners.*